Figure 1:
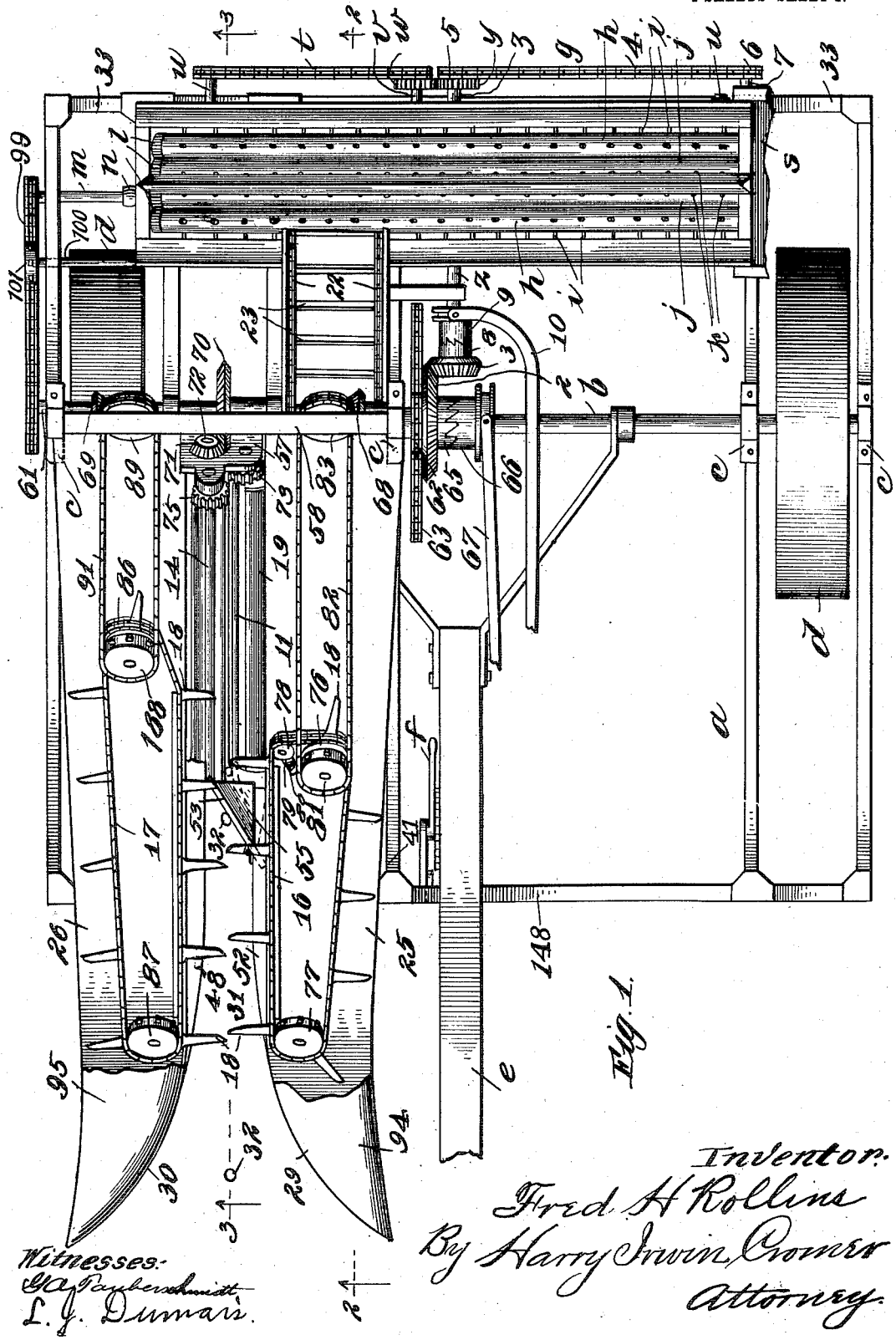

F. H. ROLLINS.
CORN HARVESTING MACHINE.
APPLICATION FILED DEC. 17, 1908.

1,049,399.

Patented Jan. 7, 1913.

4 SHEETS—SHEET 4.

Witnesses
G. A. Taubenschmidt
L. J. Dumais

Inventor
Fred H Rollins
By Harry Irwin Cromer
Atty

UNITED STATES PATENT OFFICE.

FRED H. ROLLINS, OF NEAR SUGAR GROVE, BLACKBERRY TOWNSHIP, KANE COUNTY, ILLINOIS, ASSIGNOR OF ONE-HALF TO MASSENA H. SNOW, OF BLACKBERRY TOWNSHIP, ILLINOIS.

CORN-HARVESTING MACHINE.

1,049,399. Specification of Letters Patent. Patented Jan. 7, 1913.

Application filed December 17, 1908. Serial No. 467,968.

*To all whom it may concern:*

Be it known that I, FRED H. ROLLINS, a citizen of the United States, residing near Sugar Grove, in Blackberry township, in the county of Kane and State of Illinois, have invented certain new and useful Improvements in Corn-Harvesting Machines, of which the following description, in connection with the accompanying drawings, forming a part hereof, is a specification, like characters on the drawings representing like parts.

The invention relates to that class of corn harvesting machines which are adapted to pick the ears of corn from the stalks and deliver them to a husker, or other receptacle, or to remove the ears from the stalks, the husks from the ears, and deliver the corn to a wagon or other receptacle.

The principal object of the invention is to provide a simple, economical and efficient corn harvesting machine.

A further object of the invention is to provide a corn harvesting machine adapted to be drawn lengthwise of a row or rows of corn to be harvested and to remove the ears of corn from the stalks in an efficient manner and with the minimum expenditure of power or energy, and without wasting the corn by shelling or otherwise.

Other and further objects of the invention are to provide in a corn harvesting machine, feed chain mechanism, feed-roll and rotary beater mechanism so constructed and arranged that the chain mechanism will gather and raise fallen or inclined stalks and hold the stalks in position to be engaged by the roll or rolls, so that the chain and roll or rolls will pull in opposite directions upon the stalks and the ears of corn will be raised and held in position to be operated upon by the rotary beater, said beater being between the chain and the roll or rolls and in advance of the latter, and adapted to remove the ears from the stalks by a stroke or quick blow, as distinguished from pulling, compressing, grinding or similar action, and without permitting the ears of corn to come into contact with, to pass between, or to be injured or partially shelled by the rolls which engage the stalks.

Further objects are to provide simple and efficient means for preventing the picked ears from falling to the ground, and for delivering the same to the husker or other receptacle, and means for supporting and permitting the adjustment of the rolls and beater with respect to one another, and for supporting the rolls yieldingly with respect to each other and with respect to the stalks to be engaged thereby.

Other and further objects of the invention will appear from an examination of the drawings and the following description and claims.

The invention consists principally in a corn harvesting machine comprising a pair of rolls for engaging the stalks, feed chain mechanism forward of the rolls for guiding the stalks and holding them in position to be engaged by the latter, and rotary beater mechanism between the feed chain and rolls and in advance of the latter for removing the ears of corn from the stalks. It consists further in the features, combinations and details of construction herein described and claimed.

Figure 2:
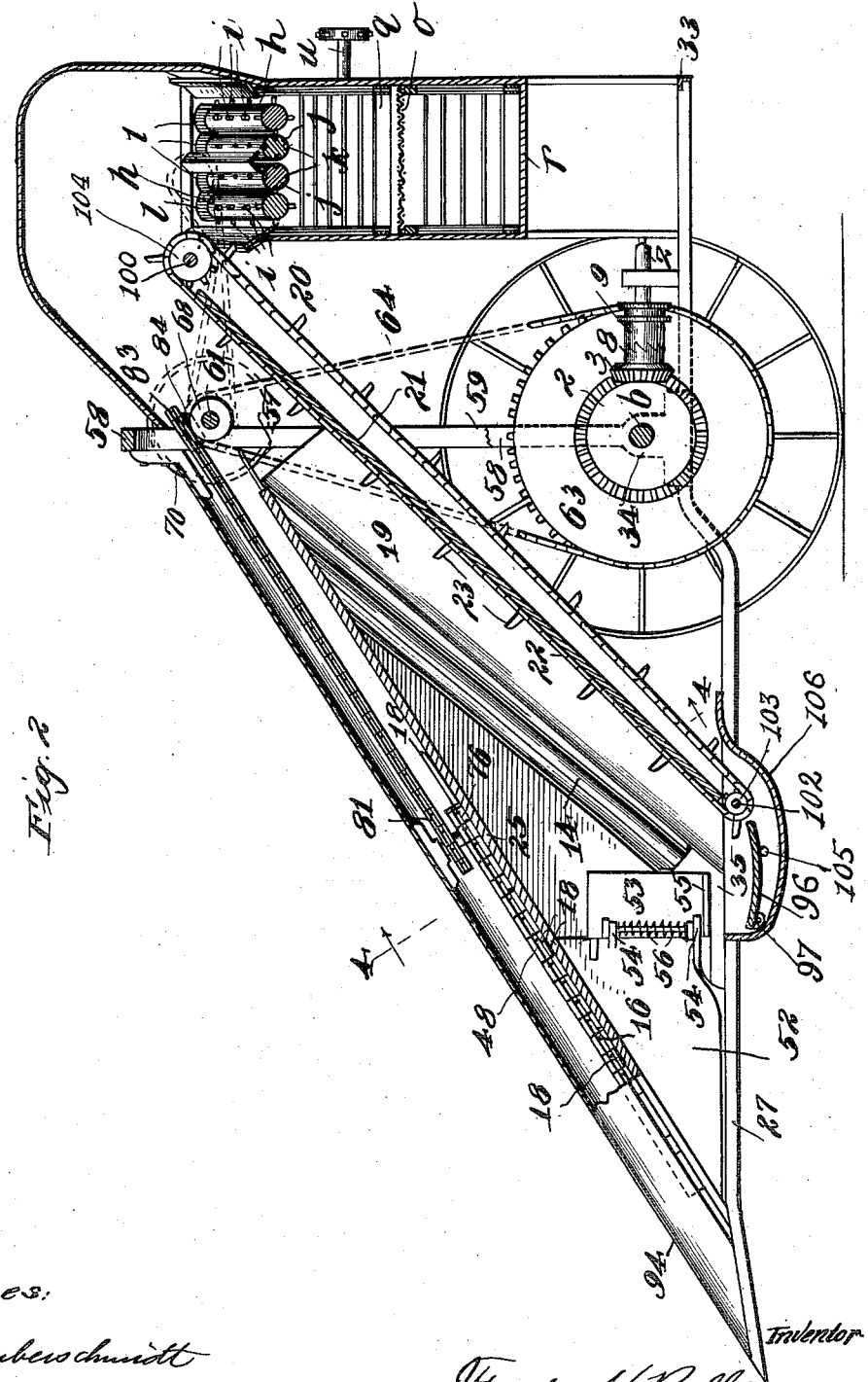
Figure 3:
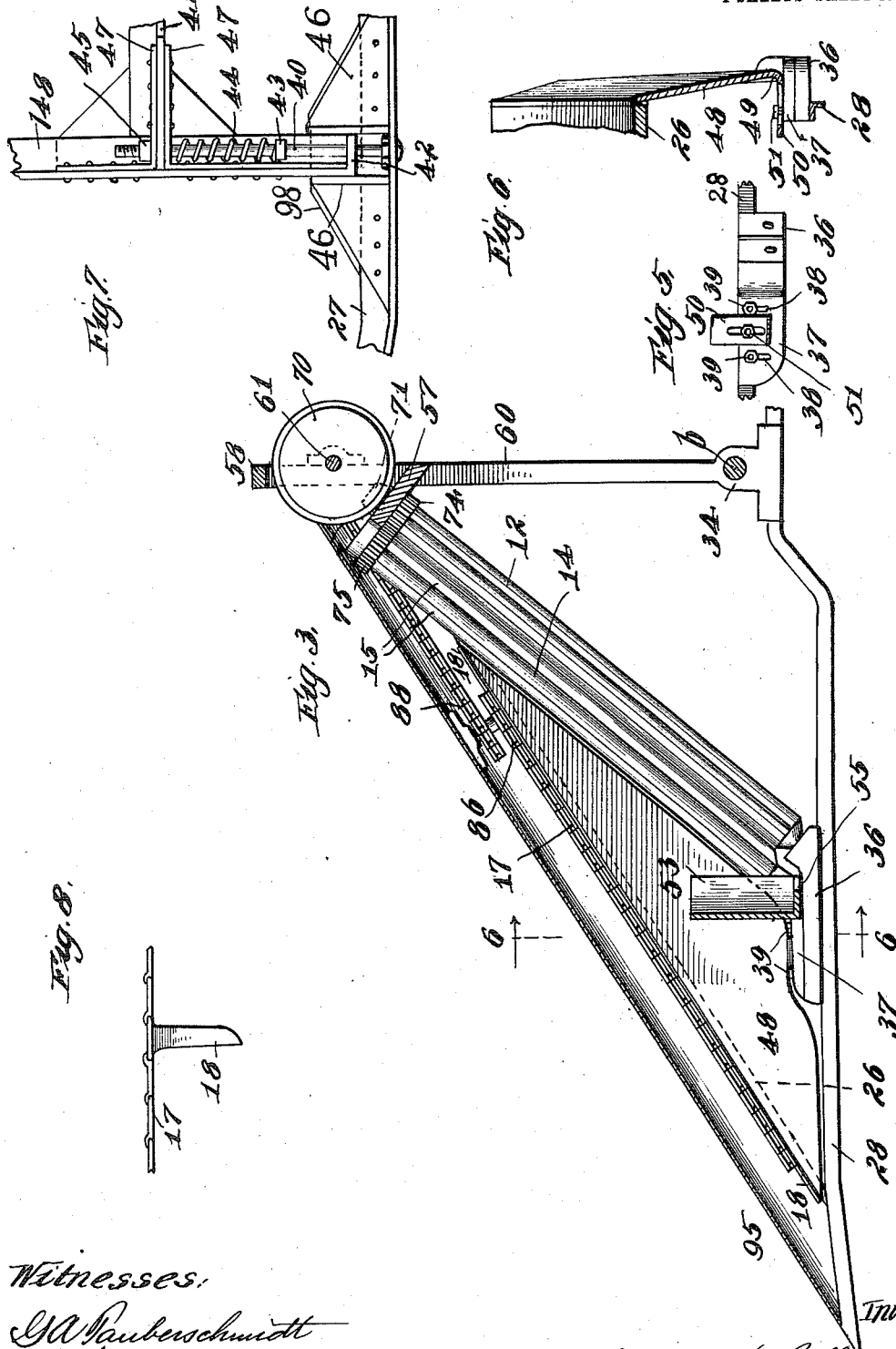
Figure 4:
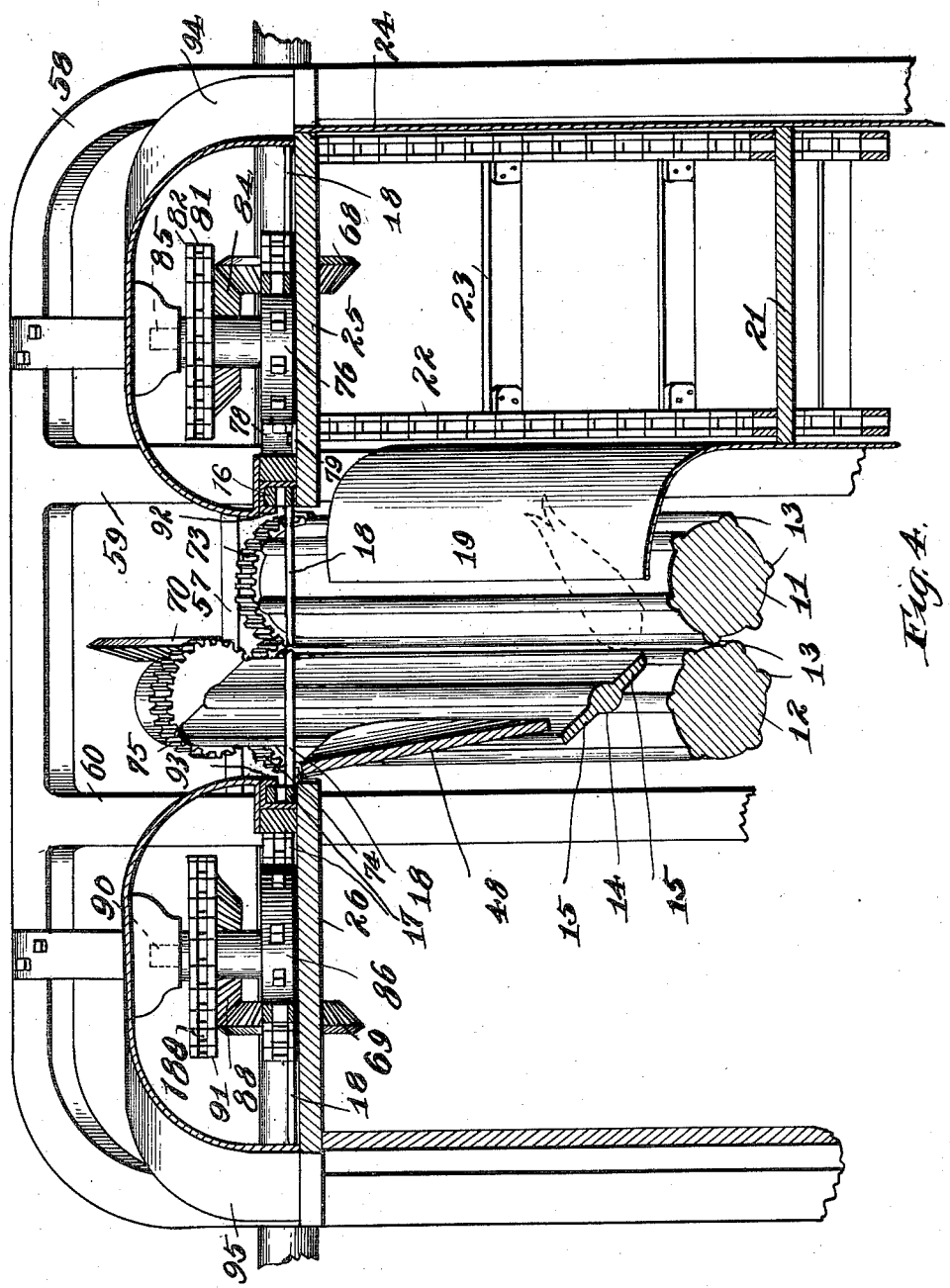

In the accompanying drawings Figure 1 is a plan view of a corn harvesting machine constructed in accordance with my improvements; Fig. 2, a longitudinal sectional view in elevation taken on line 2 of Fig. 1, looking in the direction of the arrow and showing the left shoe, or chain and roll supporting arm of the forked frame, the endless conveyer, the gate at the lower end of the rotary beater and between the rolls and chains and beneath the latter, the shield between the rolls and conveyer and over which the corn is thrown onto the conveyer by the rotary beater, and also showing in side elevation the main spur and bevel gear and clutch; Fig. 3, a longitudinal sectional view in elevation taken on line 3 of Fig. 1, looking in the direction of the arrow and showing the right-hand feed chain and roll, and the rotary beater therebetween, the adjustable bearing for the beater, the bearing for the roll, and the shoe or arm of the frame on which the said chain, beater and roll are mounted, and also showing the shield, guide, guard or side-board between said chain and the rotary beater; Fig. 4, a transverse sectional detail view taken on line 4 of Fig. 2, looking in the direction of the arrow upward and rearward at an angle to the rolls and rotary beater, and showing the rolls and conveyer back of and below the feed chains, the rotary beater between the chains and one of the rolls and forward of the latter, the shield over which the corn is discharged into the conveyer by the rotary beater, and the gear mechanism for operating the feed chains, the beater and the rolls, the feed chains and their guides being shown in cross section; Fig. 5, a detail plan view of the bearing blocks for the rotary beater and the roll adjacent thereto, the beater bearing being adjustable with respect to the bearing for the roll; Fig. 6, a transverse detail sectional view taken on line 6 of Fig. 3, looking in the direction of the arrow, and showing in section the bearing blocks for the beater and roll shown in Figs. 3 and 5, and the adjustable shield, guide or side board between the rotary beater and the feed chain; Fig. 7, a bottom plan view in detail of the means for adjusting and yieldingly supporting one of the shoes with its roll, with respect to the other shoe and roll, or roll and beater and their supports; and Fig. 8, a detail view of a toothed feed chain, both of which are of substantially the same construction.

In constructing a corn harvesting machine in accordance with my improvements, I provide a frame $a$, the rigid portions of which may be of any ordinary or desired form and preferably of angle iron construction, said frame being mounted upon an axle $b$ by means of suitable bearings $c$ which are adapted to permit the rotation of the axle. The axle is mounted on and in fixed relation to at least one of a pair of supporting or traction wheels $d$. A tongue $e$ is connected with the frame in such a manner as to permit the forward portion of the frame to be raised and lowered with respect thereto, and a lever $f$, for raising and lowering the forward frame with respect to the tongue, or with respect to the ground, is connected with the tongue and frame respectively in any ordinary and well known manner. A husker $g$ is preferably mounted on the same frame with the picker mechanism or rolls, rotary beater and feed chain and conveyer mechanism hereinafter described, and said husker may be of any ordinary known or desired form. The husker here shown comprises husker rolls $h$ provided with teeth $i$ adjacent to and adapted to rotate in a direction opposite to that of inner or alternate rolls $j$ having openings $k$ for receiving the teeth $i$. The rolls $h$ and $j$ are connected by means of gears $l$ operatively connected with a shaft $m$ preferably by means of a universal joint $n$, or in any ordinary known manner. Beneath the husker rolls is arranged the usual screen or sieve $o$ adapted to permit the shelled corn to pass down through the lower lap of the open endless chain husk-conveyer $q$ onto the inclined chute or slide board $r$ and to the inclined endless conveyer $s$ which delivers the corn into the wagon or other receptacle, not shown. The conveyer $q$ which discharges the husks from beneath the husker rolls has its upper lap located over the screen $o$ and is operated by a chain $t$ and shafts $u$ and $v$. On the shaft $v$ is a spur gear wheel $w$ which is in toothed engagement with a similar gear wheel $y$ on a shaft $z$. The shaft $z$ is connected with the main driving shaft or axle $b$ by means of a bevel gear wheel 2 on the main driving shaft or axle, and a bevel pinion 3 on the shaft $z$ and in toothed engagement with the wheel 2. The conveyer $s$ which leads to the wagon or other receptacle, is operated by the shaft $z$, which is connected with said conveyer $s$ by means of a chain 4 mounted on sprockets 5 and 6, which sprockets are upon shafts $z$ and 7 respectively. The shaft 7 also forms one of the supports for the endless conveyer $s$. The conveyer $s$ may be of any ordinary known or desired form and need not be described in order to enable those skilled in the art to understand, make and use the invention, of which said conveyer forms no new element. In order to enable the above described conveyers to be stopped and started as desired independently of the picker mechanism and husking rolls a clutch is interposed between the shafts $z$ and $b$. This clutch may be of any ordinary or desired form, and is here shown as comprising a clutch member 8 in fixed relation to the pinion 3 which is rotatable on the shaft $z$, and a clutch member 9 in feathered connection with the shaft. A lever 10, suitably mounted and connected with the clutch member 9 serves as a means for operating the latter so as to operatively connect and disconnect the pinion 3 and shaft $z$, and thereby the shaft $b$ and the conveyer mechanism, as desired.

In constructing the picker mechanism or corn gathering mechanism of a corn harvesting machine in accordance with my improvements and adapted to be used in connection with husker mechanism such as that above described, or adapted to be used with or without husker mechanism of any type or suitable form, I provide a pair of rolls 11 and 12, arranged in parallel relation and adjacent to each other, but in position to provide a small space therebetween of sufficient width to admit stalks of corn or the like. The rolls are each provided with peripheral longitudinally extending ribs 13 having spaces therebetween adapted to permit the ribs to intermesh or overlap with those of the opposite roll when desired. These rolls are mounted at an incline, with their lower ends in advance of the upper ends, and are adapted to pass along opposite sides of a row of corn and in gripping or feeding engagement with opposite sides of the stalks respectively. A beater 14, having preferably a plurality of longitudinal blades 15 is rotatably mounted in front of, preferably parallel with and adapted to rotate in a direction opposite to the direction of rotation of one of the rolls. The inner or upwardly and forwardly moving edge of the beater blade adjacent to the corn, or of each beater blade in its turn as it comes to forwardly moving position is adapted to extend in front of the space between the rolls and strike the ears of corn with a quick stroke or blow in such a manner as to remove them from the stalks during the passage of the stalks between the rolls and in such a manner as to prevent injury to the ears by coming into contact with or being partially shelled or ground by the rolls.

Mounted in front of and over the beater and rolls and extending at an oblique angle with respect to said beater and rolls is a pair of toothed feed chains 16 and 17. Each of these chains is provided with long teeth 18 adapted to engage the stalks of corn and to move upward with respect to the stalks and rearward with respect to the machine and toward the rotary beater and feed rolls at an oblique angle to the latter while in engagement with the stalks. The chains 16 and 17 are on opposite sides of the row of stalks from which the corn is to be gathered. One chain is in advance of the rotary beater in such a position that the beater is between the upwardly and rearwardly moving lap of said inclined toothed feed chain and the feed roll which is on the same side of the row of corn. Both chains are mounted preferably at the same incline and are adapted to travel preferably at the same speed, but on opposite sides of and at an oblique angle with respect to the stalks of corn. The speed of the chains and rolls should be such that the rearward movement of the inner corn-stalk engaging laps of the chains, and the stalk engaging sides of the rolls will correspond substantially with the forward movement of the machine. The teeth of the inclined upwardly and rearwardly moving laps of both chains are thus adapted to meet between the stalks engaged thereby and to tend to pull upward upon the stalks in opposition to the relatively downward and rearward pull of the feed rolls. The rotary beater being between the inclined feed chains and rolls, and the chains being on opposite sides of and in oblique relation to the stalks, it will be seen that all of said members are adapted to simultaneously engage and operate upon the same stalks. The chains and rolls simultaneously engage and present the stalks in such position that as the machine moves forward the rotary beater will be enabled to strike the ears at points in advance of the portions of the rolls with which the ears would otherwise come in contact. Although the chains may first come into contact or engagement with the stalks, and the beater may engage the stalks before they are reached by the rolls yet the engagement of the rolls and chains usually continues until all of said members, the chains, the rolls and the beater are for a period simultaneously in engagement with the stalks or material to be operated upon. The chains and rolls thus serve to gather together the stalks and present the ears of corn in position to be operated upon by the rotary beater at points between the rolls and the upwardly and rearwardly moving laps of the inclined toothed feed chains. The rolls tend to draw the uppermost ears downward, and the chains tend to raise the inclined and lowermost stalks and ears and present them in position to be removed by a quick stroke of the rotary beater without coming into contact with the rolls so as to be injured or partially shelled or ground thereby. The rotary beater is thus adapted to remove the ears from the stalks by a quick stroke or strokes of its rapidly revolving blade, and, by the same stroke or strokes, to deliver or discharge the ears over the shield 19 into an endless inclined conveyer 20 or other suitable receptacle. Said conveyer is inside of a chute, one side of which is open toward the rolls and beater, and the other side of which is closed. The side wall toward the rolls and beater is formed by the curved shield 19 already mentioned. The bottom of the chute or conveyer is formed by an inclined board or metallic plate 21 on which the upper lap of the endless conveyer chains 22, with its blades or buckets 23 travel upward and rearward, or toward the husker or other receptacle. A side board 24, of wood or metal forms the bumping board and opposite or outer side of the chute or conveyer, and a board or metallic plate 25, which extends upward and rearward over the bottom board 21 at an incline corresponding to the incline at which the feed chains above described are to be mounted, forms a cover for the chute or conveyer and a support for one of the toothed feed chains. The opposite toothed feed chain is mounted upon a similar inclined board or plate 26, said inclined boards or plates 25 and 26 being provided with a space therebetween forming a passage adapted to admit the corn or stalks, and across which the teeth of the feed chains extend into engagement with the stalks or corn, as shown in Fig. 1.

Beneath the inclined feed chain supporting boards or plates 25 and 26 the frame of the machine is provided with a pair of forwardly projecting arms or shoes 27 and 28 formed preferably of angle iron and adapted to pass along opposite sides of a row of corn or material to be operated upon. The forward ends of these shoes or frame arms are curved outward in opposite directions forming spreading or curved diverging nose portions 29 and 30. The shoes and the inclined boards or chain supporting plates 25 and 26 thus form the forwardly and downwardly projecting arms of a forked frame and provide a passage 31 through which the stalks of corn 32 may pass between the rolls and feed chains already described. The angle irons which form the shoes or base members of the forked or diverging arms of the frame should preferably extend back to the rearmost frame member 33 of the main frame, and should be provided with bearings 34 for the axle. A bearing block 35, on the shoe 27 forms a bearing for one of the feed rolls 11, at its bottom end, and a similar bearing block 36 on the shoe or frame member 28 forms a bearing for the opposite feed roll 12. A bearing block 37 is mounted on the bearing block 36 and thereby supported upon the shoe 28, forming an adjustable bearing for the rotary beater 14. This bearing is adapted to permit the lower end of the beater to be adjusted transversely with respect to the feed rolls and feed chains, and is provided with transverse perforations 38 through which extend bolts 39 by means of which the bearing, and thereby the beater, is adjustably secured in any desired adjusted position.

In order to enable the rolls to be adjusted with respect to each other and to provide means for yieldingly supporting one of said rolls, so as to provide a sufficiently flexible or yielding engagement with the stalks passing between and engaged by the rolls, and thereby reduce the power consumed in operating the machine and the wearing away and breaking of parts, I connect one of the shoes or roll supporting frame members flexibly or yieldingly with the main frame, preferably at a point forward of the roll supported by said shoe. For this purpose, a bolt 40 is secured preferably in fixed relation to the shoe 27, as shown in Fig. 7 so as to extend transversely therefrom and loosely through a perforated rigid portion 41 of the main frame. The shoe 27 is sufficiently flexible to permit it to yield laterally, and its rear portion is fixed to the main frame. A collar or eye 42 in the main frame forms a bearing for the portion of the bolt near the shoe. A collar 43 is mounted on and movable with the bolt. A spring 44 encircling the bolt is interposed between the collar 43 and frame portion or bearing 41, and is adapted to yieldingly hold the shoe and thereby the roll mounted thereon, in operative position. A nut 45 limits the outward movement of the yielding or flexibly connected shoe toward the opposite shoe, and plates 46 and 98 on the shoe form guides for engaging the frame member 148 in which the bolt is mounted, for guiding the flexibly connected parts. Angular brace plates 47 extend down to the bolt.

An adjustable guiding plate 48, formed preferably of sheet metal and having a bottom flange 49 adjacent to the top side of the beater 14 is secured at its upper edge preferably to the inclined chain supporting plate 26 in such a manner as to permit the bottom edge of said guiding plate to be adjusted transversely with respect to the rotary beater and form a guard and side guard on one side of the stalks between the beater and the corresponding toothed feed chain between which members said guide is mounted. In order to permit the adjustment of this guiding plate to be performed, it is provided with a slotted portion or arm 50 through which extends a bolt 51 which is mounted in the bearing 37 which bearing supports the lower end of the rotary beater. The lower edge of this guiding plate at a point just in advance of the lower end of the rotary beater diverges outward and forward from a point near the center of the passage 31 at an oblique angle to the shoe and to the upper edge of said guiding plate, and an inclined plate 52 extends at a similar diverging angle forward and transversely in the opposite direction on the opposite side of the passage and the row of corn, so that the passage is gradually narrowed by said guiding plates from its forward end to a point near the bottom ends of the rolls and rotary beater. At the rear end of the plate 52 is mounted a hinged gate 53, the forward edge of which is flexibly secured to the rear end of said plate 52 by means of hinges 54. The bottom edge of the gate is provided with a wide flange or bottom 55 which extends from the hinged side of the gate to the bottom of the rolls and beater, and transversely,—when the gate is in normal position,—from the plate 48 on the opposite side of the passage to the curved shield and bottom of the chute and endless conveyer. (See Fig. 1.) When in the position shown in full lines in Fig. 1, this gate closes the passage 31, and forms the bottom of a pocket adapted to receive such corn as may be loosened from the stalks or picked by the rotary beater and not properly or in the usual manner delivered by the beater into the endless conveyer. The gate serves effectually to prevent the picked corn thus loosened, from dropping to the ground and being wasted as it would otherwise do, and is adapted to be operated by the feed chains and the corn stalks engaged thereby. To dump the corn caught by the door or gate, the corn stalks are engaged by the feed chains and the stalks and gate are caused to press against the tension of a spring 56 until the gate is moved to position to deliver the corn into the chute or endless conveyer, as shown by broken lines in Fig. 1. As soon as the stalks pass beyond the gate it is thrown back to normal corn-receiving or pocket-forming position by the action of the spring. The spring may be of any ordinary or desired form adapted to yieldingly hold the gate or door in operative position. The gate, when in normal position should extend rearward and toward the bottom of the rotary beater and the corn and opposite guiding plate or shoe at an oblique angle. In other words, the surface of the gate to be engaged by the stalks should be oblique with respect to the direction of movement of the machine, and the gate is adapted to automatically close the passage through which the corn or stalks pass to the beater and rolls, or picking mechanism. The opening of the gate, and thereby the passage, is also accomplished automatically, and the corn held by the gate is automatically discharged into the chute or conveyer. The upper ends of the rolls and rotary beater are mounted in suitable bearings in a bracket 57. The bearings may be of any desired or known form.

The rotary beater, the toothed feed chains, and the rolls are provided with gear and chain mechanism for operating them, which operating mechanism may be of any desired or well known form adapted to be connected with and operated by the main shaft and traction wheel or wheels, and preferably adapted to be connected with and disconnected from said shaft and traction wheel or wheels independently of the mechanism for operating the conveyers under the husking rolls. An upright frame portion 58, formed preferably of angle iron and provided with standards 59 and 60 forms a support for the bracket 57 already described, and thereby, for the rolls and beater. It also supports the inclined plates or boards 25 and 26 at their rear ends, and the chains and gear mechanism connected with said chains, rolls and beater. A horizontal shaft 61 is mounted in suitable bearings in said upright frame portion 58, and is provided with a sprocket wheel 62 thereon. Said sprocket wheel is operatively connected with the main axle and thereby with the traction wheel by means of a main driving sprocket wheel 63 loosely mounted on the main driving shaft or axle already described, and a chain 64 which connects said sprockets. The sprocket 63 is provided with a clutch member 65, and a clutch member 66 is mounted in feathered engagement with the main driving shaft or axle and movable lengthwise thereof by means of a lever 67. Said lever may be of any desired or known form adapted to throw the clutch into and out of operative position.

Mounted upon and in fixed relation to the shaft 61 are bevel gear wheels 68, 69, and 70. The latter is in toothed engagement with a bevel pinion 71 which is directly connected with and in fixed relation to the feed roll 12 already described, by means of the shaft 72 of said roll. The rolls 11 and 12, and the beater 14 are each provided with spur gear wheels 73, 74, and 75, respectively, the gears of the two rolls being in toothed engagement, and the gear wheel of one roll—the one which is on shaft 72 and connected with pinion 71, preferably—is in toothed engagement with the gear wheel of the rotary beater.

The toothed feed chain 16 is mounted upon a driving sprocket 76, and idlers 77 and 78, all on stub shafts which are supported by the inclined board or plate 25. The idler 78 is adjustably supported upon a movable arm 79 which is pivotally connected with the plate 25 by means of a pin or bolt 80. A sprocket 81 is mounted in fixed relation to the sprocket 76, and the latter is operatively connected with the shaft 61 by means of said sprockets 81, a chain 82, a sprocket 83 which is in fixed relation to a bevel gear wheel 84, the latter being in toothed engagement with the bevel gear 68, on the shaft 61. A stub shaft 85 mounted upon a suitable support, preferably on the shaft 61, supports the sprocket 83 and gear 84.

The toothed feed chain 17 is mounted on a sprocket 86, and an idler 87, and a sprocket 188 is mounted on the same stub shaft with and in fixed relation to the sprocket 86. The stub shaft is mounted in the inclined supporting plate 26. A bevel pinion 88 is mounted in toothed engagement with the bevel gear wheel 69, and a sprocket 89 is mounted upon the same shaft 90, and in fixed relation to the bevel gear wheel 88, and connected with the sprocket 86 by means of a chain 91. The toothed feed chains 16 and 17 are each provided with an angle iron guide 92 and 93, respectively. (See Fig. 4.) These guides are in engagement with and adapted to hold the upwardly and rearwardly moving laps of the chains, respectively, in operative position. The idler 78 and sprocket 86 are located at a sufficient distance from the space 31 to permit the gradual withdrawal of the teeth of the chains 16 and 17 from engagement with the stalks. Curved and tapered shields 94 and 95, having spaces between their inner edges and the chain supports, for permitting the teeth of the feed chains to extend out into engagement with the corn, form nose portions of the forward ends of the shoes and coverings for the feed chains and gear mechanism over the shoes.

The endless conveyer 20 is supported upon shafts 100 and 102, and sprockets 103 and 104 on said shafts. (See Figs. 1 and 2.) The shaft 100 is provided at its outer end with a sprocket 101; and a sprocket chain 99 connects the shafts $m$, 61, and 101. This chain is mounted on sprockets, not shown, on shafts 61 and $m$ respectively, and its upper lap extends under and in engagement with the sprocket 101, as shown in Fig. 1. An apron or false bottom 96 is mounted in the bottom of the chute adjacent to the bottom of the conveyer 20, and supported by means of a hinge 97, on one side or edge, and a stop or supporting rod 105 beneath its upwardly and downwardly swinging side. The swinging side of this hinged apron or false bottom is adjacent to the endless conveyer and is adapted to be raised by the blades or buckets of the conveyer as they pass upward. It is formed preferably of a piece of curved sheet metal adapted to receive the picked corn delivered thereto and hold it in position to be carried up by the conveyer. The lowermost bottom portion of the chute or conveyer casing is formed of a depending cup-shaped sheet metal casing or chute portion 106, supported by and extending slightly below the shoe and main frame.

I claim:—

1. In a machine of the class described, the combination of feed chain mechanism adapted to engage stalks of the material to be operated upon, roller mechanism mounted in oblique relation to said feed chain mechanism, and a rotary beater located between said roller mechanism and said feed chain mechanism for removing the ears from the stalks.

2. In a machine of the class described the combination of feed chain mechanism extending upward and rearward at an incline, roller mechanism mounted back of and in oblique relation with respect to the feed chain mechanism, and a rotary beater located between the roller mechanism and the feed chain mechanism and extending below the rear portion of the latter.

3. In a machine of the class described, the combination of a feed chain extending upward and rearward at an incline, a rotary beater back of the forward portion of and in oblique relation to the feed chain, for removing the ears from the stalks of the material to be operated upon, and roller mechanism back of the rotary beater adapted to engage and feed the stalks of the material to be operated upon past the beater.

4. In a machine of the class described, the combination of a feed chain having a feeding lap adapted to travel upward and rearward at an incline in engagement with the stalks of the material to be operated upon, a rotary beater in oblique relation to said feed chain and having stalk and ear engaging blade portions adapted to move in a direction opposite to that of the movement of the stalks relatively to the beater, and means adjacent to the beater for feeding the stalks past the latter.

5. In a machine of the class described, the combination of a pair of feed chains having toothed feeding laps adapted to travel upward and rearward at an incline in engagement with the stalks of the material to be operated upon, a pair of feed rolls back of and in oblique relation to said feed chains, a rotary beater located forward from the feed rolls in oblique relation to said feed chains and having stalk and ear engaging blade portions adapted to move in a direction opposite to that of the relative movement of the stalks with respect to the beater, means for operating said feed chains, beater and rolls, and a portable frame upon which said elements are mounted.

6. In a machine of the class described, the combination of a feed chain having a feeding lap adapted to travel upward and rearward at an incline in engagement with the stalks of the material to be operated upon, a pair of rolls adapted to engage the stalks and permit them to pass therebetween, a rotary beater located between one of said rolls and the feed chain, and an adjustable guiding plate between said rotary beater and said feed chain.

7. In a machine of the class described, the combination of a portable frame provided with a longitudinal passage, upwardly and rearwardly inclined rolls journaled on opposite sides of said passage and adapted to engage and permit the passage of stalks therebetween, and a rotary beater mounted in front of one of the rolls and having blades adapted to extend partially across the passage, a conveyer on the opposite side of the passage from the beater, and a transversely movable receptacle extending into the passage adjacent to the bottom of the rolls and beater.

8. In a machine of the class described, the combination of a portable frame provided with forwardly extending arms having a passage therebetween, rolls mounted on opposite sides of said passage, a rotary beater in front of one of said rolls, on one side of and adjacent to the passage, feed chain mechanism extending upward and rearward at an incline forward of the beater and rolls, a conveyer adjacent to the passage, a shield extending over a portion of one of the rolls and forming a chute member leading toward the conveyer, a guiding plate between the feed chain mechanism and the rotary beater on one side of the passage, a gate normally extending across the passage in front of the beater and rolls, and means for yieldingly holding the gate in operative position.

9. In a machine of the class described, the combination of feed chain mechanism, roller mechanism mounted back of the feed chain mechanism, a rotary beater mounted between the roller mechanism and the feed chain mechanism, a guiding plate between the rotary beater and the feed chain mechanism, a rigid supporting shoe on which the rotary beater and one of said rolls are mounted, a flexibly mounted shoe on which the opposite roll is mounted, said shoes forming a tapered passage therebetween, a conveyer on the side of said passage opposite to that on which the rotary beater is located, and means for operating said conveyer, rolls, beater and chain mechanism.

10. In a machine of the class described, the combination of feed chain mechanism extending upward and rearward at an incline, roller mechanism mounted back of the feed chain mechanism and in oblique relation thereto, a pair of diverging frame arms forming a passage on opposite sides of which the rolls forming said roller mechanism are mounted, a conveyer on one side of said passage, a rotary beater mounted on the opposite side of the passage between the roller mechanism and the feed chain mechanism, a guiding plate between the rotary beater and the feed chain mechanism, a gate extending into the passage in front of the roller mechanism and beater, means for yieldingly holding the gate in operative position, a rotary axle, a traction wheel in fixed relation to the axle, a supporting wheel in engagement with and in movable relation to the axle, and means for operatively connecting the feed chain mechanism, the roller mechanism, and the rotary beater with the axle.

FRED H. ROLLINS.

Witnesses:
 HARRY IRWIN PROMER,
 CARRIE E. JORDAN.